US012644694B2

(12) United States Patent
Jeon et al.

(10) Patent No.: US 12,644,694 B2
(45) Date of Patent: Jun. 2, 2026

(54) COMPLEX PHASE DIFFERENCE SENSING DEVICE OF SAMPLE SURFACE SHAPE

(71) Applicant: SAMSUNG ELECTRONICS CO., LTD., Suwon-si (KR)

(72) Inventors: Changi Jeon, Suwon-si (KR);
Younghoon Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 18/425,830

(22) Filed: Jan. 29, 2024

(65) Prior Publication Data

US 2024/0255274 A1      Aug. 1, 2024

(30) Foreign Application Priority Data

Jan. 31, 2023      (KR) ........................ 10-2023-0013191

(51) Int. Cl.
| | |
|---|---|
| *G01B 11/06* | (2006.01) |
| *G01B 11/24* | (2006.01) |
| *G01B 15/04* | (2006.01) |

(52) U.S. Cl.
CPC .............. *G01B 11/06* (2013.01); *G01B 11/24* (2013.01); *G01B 15/04* (2013.01)

(58) Field of Classification Search
CPC ........ G01B 11/06; G01B 11/24; G01B 15/04; G01B 21/08; G01B 17/02; G01B 17/06; G01B 21/20; G01B 2210/56; H01L 22/12
See application file for complete search history.

(56) References Cited

U.S. PATENT DOCUMENTS

| | | | | | |
|---|---|---|---|---|---|
| 5,371,588 | A | * | 12/1994 | Davis ................. | G01B 9/02002 |
| | | | | | 356/489 |
| 5,680,212 | A | * | 10/1997 | Blouin .................... | G01P 3/366 |
| | | | | | 73/656 |

(Continued)

FOREIGN PATENT DOCUMENTS

| | | |
|---|---|---|
| KR | 10-1379043 B1 | 3/2014 |
| KR | 10-1455777 B1 | 10/2014 |

(Continued)

OTHER PUBLICATIONS

Kwak et al., "785-nm Frequency Comb-Based Time-of-Flight Detection for 3D Surface Profilometry of Silicon Devices", IEEE Photonics Journal, Oct. 5, 2022, 8 total pages, vol. 14, doi:10.1109/JPHOT.2022.3203988.

(Continued)

*Primary Examiner* — Tarifur R Chowdhury
*Assistant Examiner* — Maher Yazback
(74) *Attorney, Agent, or Firm* — Sughrue Mion, PLLC

(57) ABSTRACT

Provided is a complex sensing device including a thickness sensing device including pulse generating device configured to generate a probe pulse and a pump pulse, a first optical splitter configured to split the probe pulse and direct the pump pulse to a surface of a sample and generate an acoustic signal in the sample, a detector configured to receive a reflection probe pulse generated by the probe pulse being reflected from the sample, a first processor configured to receive and process a first signal from the detector, and a second optical splitter on a path of the reflection probe pulse from the sample to the detector, the second optical splitter being configured to split the reflection probe pulse, and a surface shape sensing device configured to receive a split probe pulse split from the first optical splitter and a split reflection probe pulse split from the second optical splitter, and measure a surface shape of the sample based on a phase (Continued)

difference between the split probe pulse and the split reflection probe pulse.

19 Claims, 5 Drawing Sheets

(56)                    References Cited

U.S. PATENT DOCUMENTS

| | | | | |
|---|---|---|---|---|
| 5,894,531 | A * | 4/1999 | Alcoz | G01H 9/004 |
| | | | | 385/11 |
| 6,108,087 | A * | 8/2000 | Nikoonahad | G01N 29/348 |
| | | | | 356/511 |
| 6,175,416 | B1 * | 1/2001 | Maris | G01N 21/1702 |
| | | | | 356/432 |
| 6,321,601 | B1 * | 11/2001 | Maris | G01N 21/211 |
| | | | | 73/657 |
| 6,472,237 | B1 * | 10/2002 | Frisa | H01L 22/12 |
| | | | | 257/E21.53 |
| 6,504,618 | B2 * | 1/2003 | Morath | G01N 29/2418 |
| | | | | 356/630 |
| 6,549,285 | B1 * | 4/2003 | Wright | G01N 21/1717 |
| | | | | 356/497 |
| 7,262,861 | B1 * | 8/2007 | Pepper | G01B 17/02 |
| | | | | 356/502 |
| 8,312,772 | B2 | 11/2012 | Tas et al. | |
| 10,163,669 | B2 | 12/2018 | Hung et al. | |
| 11,287,253 | B2 | 3/2022 | Liu et al. | |
| 11,454,491 | B2 | 9/2022 | Wang et al. | |
| 11,486,982 | B2 | 11/2022 | Kim et al. | |
| 2003/0011776 | A1 * | 1/2003 | Ogawa | G01J 11/00 |
| | | | | 356/450 |
| 2004/0207850 | A1 * | 10/2004 | Kwak | G01N 21/636 |
| | | | | 356/432 |
| 2006/0272418 | A1 * | 12/2006 | Maris | G01S 15/8965 |
| | | | | 430/5 |
| 2013/0129568 | A1 * | 5/2013 | Gusev | G01N 21/636 |
| | | | | 422/82.09 |
| 2017/0199027 | A1 * | 7/2017 | Maris | G01B 11/16 |
| 2019/0293407 | A1 * | 9/2019 | Tahara | H04B 10/64 |
| 2020/0182783 | A1 * | 6/2020 | Jun | G01N 21/9501 |
| 2020/0208964 | A1 * | 7/2020 | Oh | G01B 11/0666 |
| 2022/0113129 | A1 | 4/2022 | Golani et al. | |
| 2022/0228973 | A1 * | 7/2022 | Mehendale | G01N 21/1702 |
| 2022/0307818 | A1 | 9/2022 | Sheng | |
| 2022/0308017 | A1 | 9/2022 | Auffray | |
| 2025/0189605 | A1 * | 6/2025 | Mehendale | G01R 1/071 |

FOREIGN PATENT DOCUMENTS

| | | |
|---|---|---|
| KR | 10-2010172 B1 | 8/2019 |
| KR | 10-2141704 B1 | 8/2020 |
| KR | 10-2022-0034292 A | 3/2022 |

OTHER PUBLICATIONS

Lee et al., "Picosecond acoustic measurements of longitudinal wave velocity of submicron polymer films", Applied Physics Letters, Sep. 16, 1996, 3 total pages, vol. 69.

Na et al., "Ultrafast, sub-nanometre-precision and multifunctional time-of-flight detection", Nature Photonics, Feb. 10, 2020, 9 total pages, vol. 14, doi:10.1038/s41566-020-0586-0.

Jung et al., "Subfemtosecond synchronization of microwave oscillators with mode-locked Er-fiber lasers", Optics Letters, Jul. 2012, 5 total pages, doi: 10.1364/OL.37.002958.

Yang et al., "10-fs-level synchronization of photocathode laser with RF-oscillator for ultrafast electron and X-ray sources", Scientific Reports, Jan. 9, 2017, 8 total pages, vol. 7, doi:10.1038/srep39966.

Rahman et al., "On-line thin film thickness monitor by pulsed laser photoacoustics", Optics and Lasers in Engineering, Apr. 2021, doi:10.1016/j.optlaseng.2020.106482.

* cited by examiner

COMPLEX PHASE DIFFERENCE SENSING DEVICE OF SAMPLE SURFACE SHAPE

CROSS-REFERENCE TO RELATED APPLICATION

This application is based on and claims priority to Korean Patent Application No. 10-2023-0013191, filed on Jan. 31, 2023, in the Korean Intellectual Property Office, the entirety of which is incorporated herein by reference.

BACKGROUND

Embodiments of the present disclosure relate to a thickness and surface shape sensing device and a sensing method including the same, and more specifically, to a thickness and surface shape sensing device including an optical phase detector and a sensing method including the same.

In a laser pump-probe system, a pump pulse and a probe pulse are generated from a single light source and split by a light splitter. The pump pulse generates ultrasonic waves in an object such as a wafer. The probe pulse is affected by the ultrasonic waves, and a reflectance change occurs on the wafer surface. Using these two pulses, a thickness from a surface of the wafer to an interface may be measured.

SUMMARY

One or more embodiments provide a complex sensing device configured to acquire surface information of a measurement target by simultaneously sensing the thickness and shape of the surface from the surface of the wafer to the interface with a pulse and combining the measured thickness and shape of the surface.

The problems to be solved by the technical spirit are not limited to the problems mentioned above, and other problems not mentioned will be clearly understood by those skilled in the art from the following description.

According to an aspect of an embodiment, there is provided a complex sensing device including a thickness sensing device including pulse generator configured to generate a probe pulse and a pump pulse, a first optical splitter configured to split the probe pulse and direct the pump pulse to a surface of a sample and generate an acoustic signal in the sample, a detector configured to receive a reflection probe pulse generated by the probe pulse being reflected from the sample, a first processor configured to receive and process a first signal from the detector, and a second optical splitter on a path of the reflection probe pulse from the sample to the detector, the second optical splitter being configured to split the reflection probe pulse, and a surface shape sensing device configured to receive a split probe pulse split from the first optical splitter and a split reflection probe pulse split from the second optical splitter, and measure a surface shape of the sample based on a phase difference between the split probe pulse and the split reflection probe pulse.

According to another aspect of an embodiment, there is provided a complex sensing device including a thickness sensing device including a pulse generator configured to generate a probe pulse and a pump pulse, the pump pulse being transmitted toward a surface of a sample and being configured to generate an acoustic signal in the sample, a detector configured to receive a reflection probe pulse generated by the probe pulse being reflected from the sample, a first processor configured to receive and process a first signal from the detector, a phase detector configured to receive a split reflection probe pulse split from the reflection probe pulse, and a surface shape sensing device configured to obtain a surface shape of the sample based on a split probe pulse split from the probe pulse and a signal output from the phase detector for measurement.

According to another aspect of an embodiment, there is provided a complex sensing method including emitting a probe pulse and a pump pulse from a pulse generating device, splitting the probe pulse toward a sample by a first optical splitter, irradiating the sample with the pump pulse and the probe pulse, transmitting a reflection probe pulse, which is the probe pulse reflected by the sample, to a detector, splitting the reflection probe pulse toward the detector by a second optical splitter, inputting a first pulse split from the probe pulse by the first optical splitter and a second pulse split from the reflection probe pulse by the second optical splitter to a surface shape sensing device, sensing a thickness of the sample based on a change in reflectance of the sample obtained by the detector, and sensing a surface shape of the sample through time of flight difference data between the first pulse and the second pulse in the surface shape sensing device.

BRIEF DESCRIPTION OF DRAWINGS

Embodiments will be more clearly understood from the following detailed description taken in conjunction with the accompanying drawings in which.

DETAILED DESCRIPTION OF EMBODIMENTS

Figure 1:
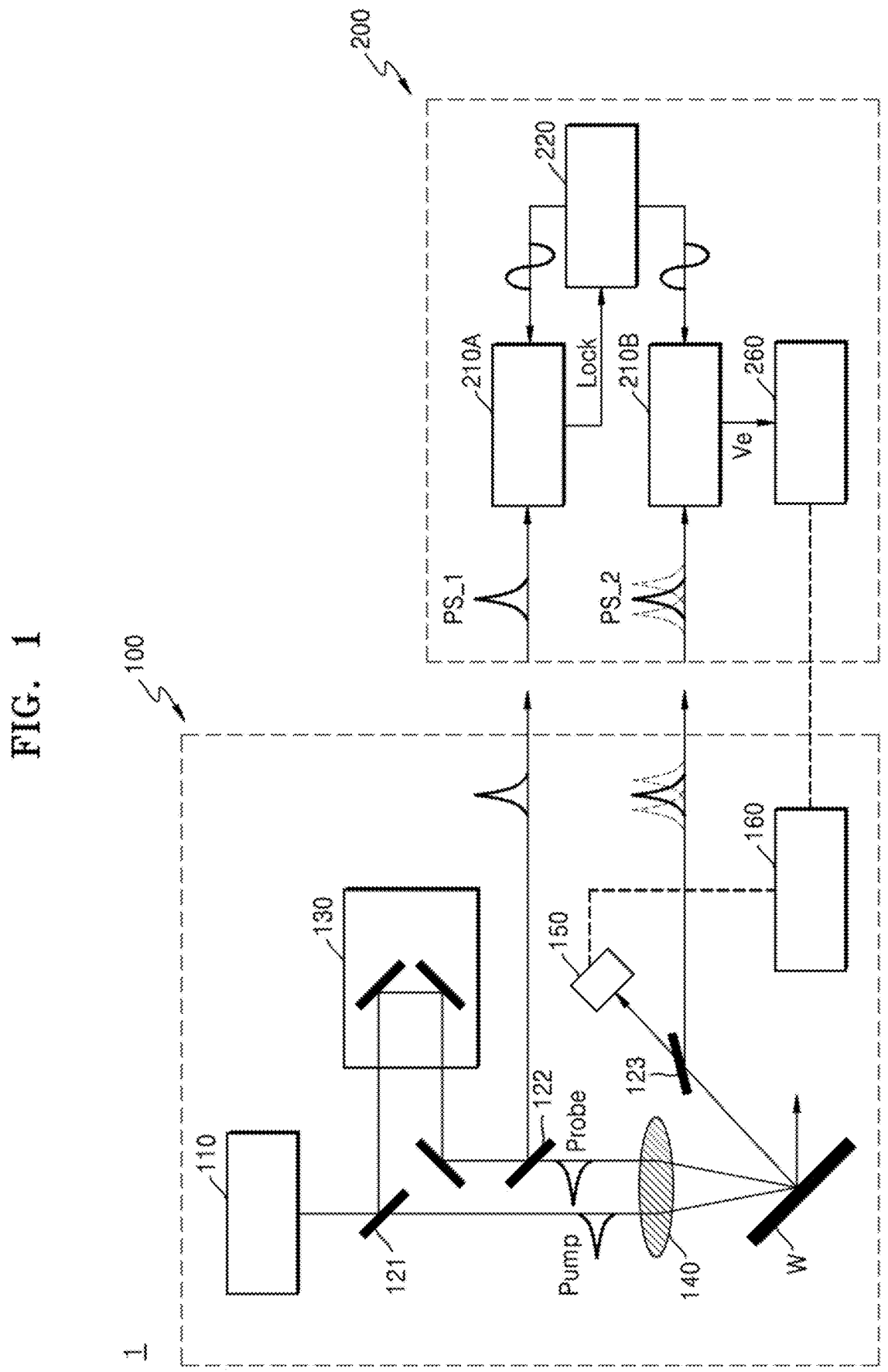
FIG. 1 is a conceptual diagram schematically illustrating a complex sensing device according to an embodiment.

Hereinafter, embodiments of the technical idea will be described in detail with reference to the accompanying drawings. The same reference numerals are used for the same components in the drawings, and duplicate descriptions thereof are omitted.

Embodiments described herein are example embodiments, and thus, the disclosure is not limited thereto.

Figure 2:
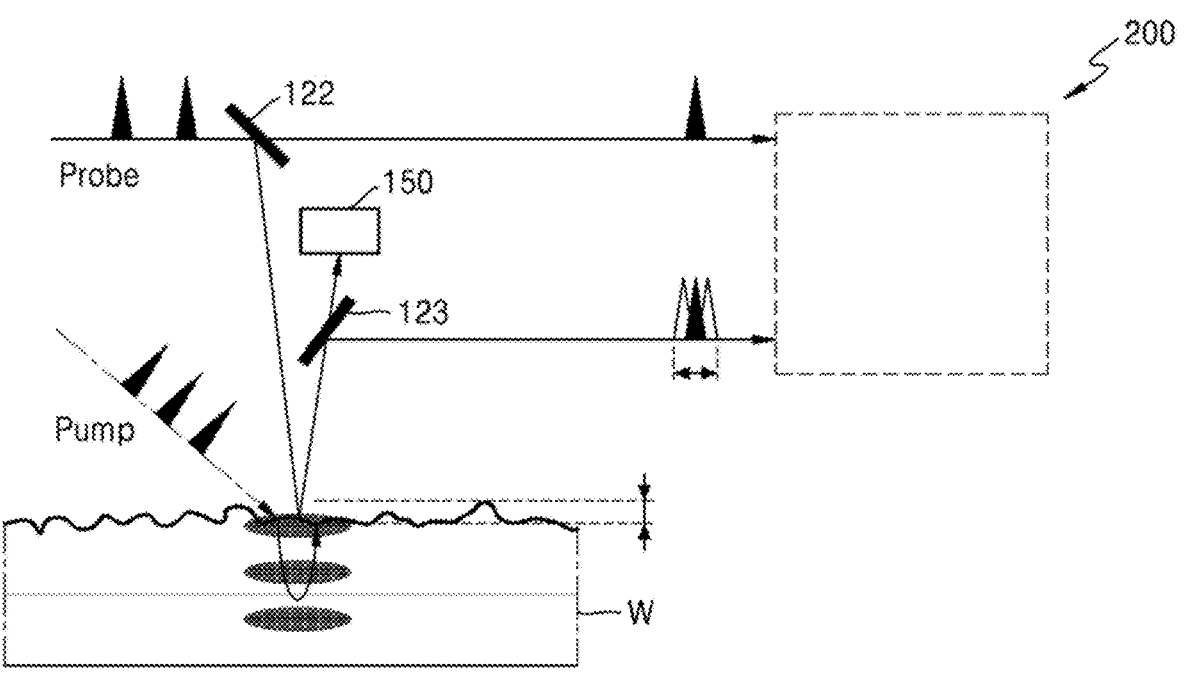
FIG. 2 is a conceptual diagram illustrating the operating principle of the complex sensing device according to an embodiment.
Figure 3:
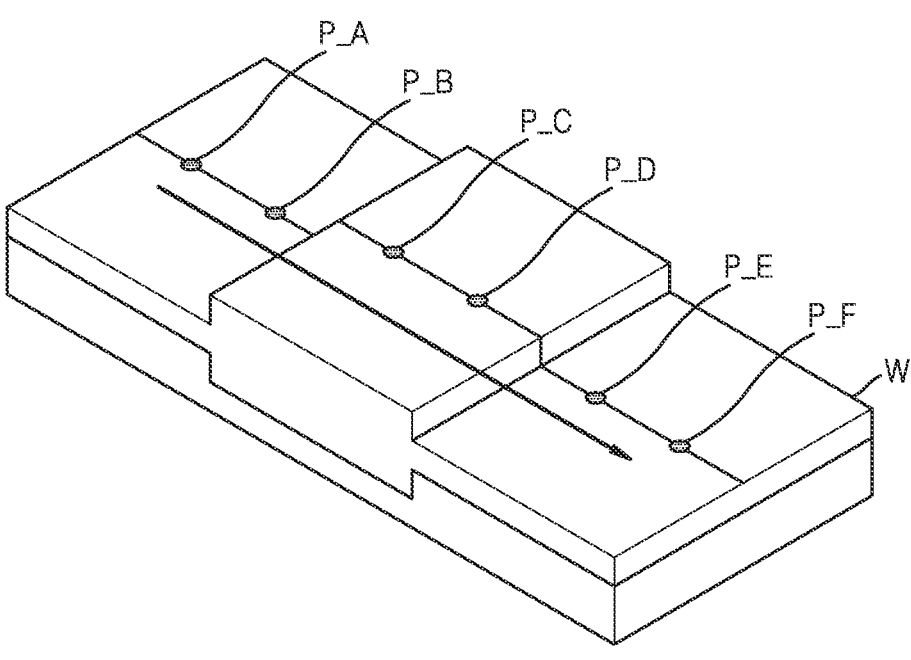
FIG. 3 is a conceptual diagram illustrating the operating principle of the complex sensing device according to an embodiment.
Figure 3:
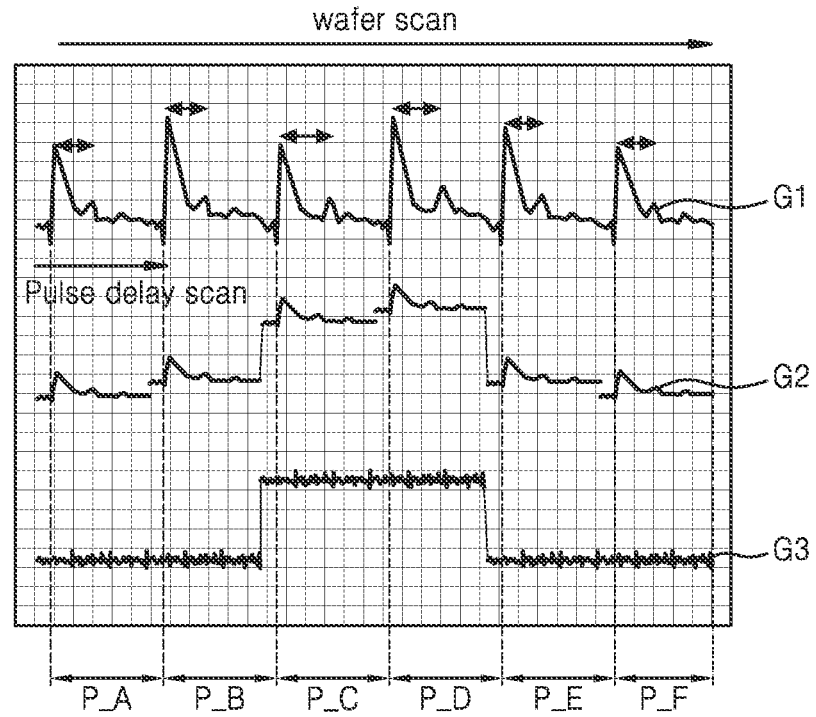

FIG. 1 is a conceptual diagram schematically illustrating a complex sensing device 1 according to an embodiment. FIG. 2 is a conceptual diagram illustrating the operating principle of the complex sensing device 1 according to an embodiment. FIG. 3 is a conceptual diagram illustrating the operating principle of the complex sensing device 1 according to an embodiment.

Referring to FIGS. 1 to 3, the complex sensing device 1 according to an embodiment may include a thickness measuring device 100 and a surface shape sensing device 200. The thickness measuring device 100 includes a light source 110, a pulse splitter 121, a delay stage 130, a first light splitter 122, a condensing lens 140, a second light splitter 123, a detector 150, and a first processor 160. The light source 110, the pulse splitter 121 and the delay stage 130 may be implemented as a pulse generator or a pulse generating device. The surface shape sensing device 200 may include a first phase detector 210A, a radio frequency (RF) signal source 220, a second phase detector 210B, and a second processor 260. In the present disclosure, the first phase detector 210A may be referred to as a phase detector for synchronization, and the second phase detector 210B may be referred to as a phase detector for measurement. In the present disclosure, a pulse may refer to a pulse train.

Electromagnetic waves of a certain frequency range may be generated from the light source 110. In an example embodiment, a pulsed laser may be generated in the light source 110. The laser pulse generated from the light source 110 may be split into a probe pulse traveling from the pulse splitter 121 to the delay stage 130 and a pump pulse traveling to the condensing lens 140. The delay stage 130 changes a traveling distance between the pump pulse and the probe pulse to generate a phase difference. The delay stage 120 may be implemented by one or more of optical lenses, glasses and/or mirrors, fiber optic lines, etc. The delay stage 120 may also include a Mach-Zehnder interferometer.

According to another embodiment, a separate light source may generate both the pump pulse and the probe pulse. In the present disclosure, a pulse generating device may include the light source 110, the pulse splitter 121, and the delay stage 130.

The light source 110 or the pulse generating device may generate a femtosecond laser. A femtosecond laser may be mode-locked. A femtosecond laser is a laser that continuously generates very short light pulses in a femtosecond scale at regular intervals.

In an embodiment, the wavelength of the femtosecond laser is greater than or equal to 750 nm and less than or equal to 850 nm. The repetition rate of the laser pulse may be within 100 MHz. The wavelength of the femtosecond laser may be determined to be, for example, around 800 nm. The pulse width means a full width half maximum (FWHM) of a pulse size at the maximum output pulse, and the FWHM of the laser pulse may be formed in a range that is less than or equal to about 1 ps.

The probe pulse passing through the delay stage 130 and the pump pulse passing through the pulse splitter 121 may pass through the condensing lens 140. The condensing lens 140 is configured to transmit the probe pulse and the pump pulse to the same position of the sample W. The condensing lens 140 may be adjusted so that the probe pulse and the pump pulse, which are laser pulses, are transmitted to the measurement target point of the sample W in an appropriate size. The condensing lens 140 may be composed of a plurality of various types of lenses.

The thickness sensing device 100 may further include a collimator. The collimator may be provided in a path so that the probe pulse and the pump pulse proceed in parallel. In an embodiment, the thickness sensing device 100 may be configured such that the pump pulse and/or the probe pulse passing through the condensing lens 140 are incident on the sample W through a collimator before reaching the sample W.

The sample W may be a wafer, and in the present disclosure, the sample W may be referred to as a wafer. In the present disclosure, the case where the sample W is a wafer is described, but embodiments are not limited thereto. The complex sensing device 1 according to an embodiment may include a carrying unit that supports the sample W and moves the sample W on a plane so that the complex sensing device 1 may continuously sense the sample W.

The pump pulse first transmitted to the sample W generates an acoustic signal in the sample W. In the present disclosure, the acoustic signal may be referred to as a sound wave. The pump pulse proceeds from the surface of the sample W to the interior of the sample W until the pump pulse encounters a certain interface of the sample therein. At the interface of the sample W, an acoustic signal passing through the interface and an acoustic signal reflected from the interface may be generated. An echo, which is an acoustic signal reflected from the interface, may return to the surface of the sample W.

The probe pulse transmitted onto the surface of the sample W and reflected from the surface of the sample W may change due to the echo of the pump pulse returning to the surface of the sample W. The opaque surface layer on the surface of the sample W absorbs energy from the pump pulse and emits a longitudinal sound wave traveling downward at the speed of sound relative to the material of which the sample W is made. The echo, which is a sound wave reflected by the interface inside the colliding surface, causes a change in the sample W of that part. For example, the change may be a change in refractive index.

For example, when the echo reaches the surface of the sample W and changes occur, the reflectivity of the surface of the sample W with respect to the probe pulse may change. The intensity of the reflection probe pulse reflected on the surface of the sample W may be changed by the change in the reflectance.

The detector 150 may convert the reflection probe pulse into a first signal. The first signal transmitted from the detector 150 may be received by the first processor 160. The first processor 160 may obtain the thickness from the surface of the sample W to the interface from the first signal.

The thickness reaching the interface inside the surface of the sample W may be obtained as half of a value obtained by multiplying the sound velocity with respect to the material inside the surface by the reciprocating time of the sound wave with respect to the thickness. The reciprocating time of the sound wave with respect to the thickness may be the time until the pump pulse reaches the surface of the sample W and the echo generated by the pump pulse reaches the surface of the sample W again.

The time for sound waves to travel from the surface of the sample W to the interface may be obtained from the data of the first graph G1, which is an example of the results obtained by the detector 150 and the first processor 160 in FIG. 3. The graphs of FIG. 3 show a comparison between three graphs including a first graph G1, a second graph G2 to be described later, and a third graph G3 to be described later, Each graph may represent values in different units for the vertical axis, and the vertical axis values of each graph represent relative values within the graph.

The horizontal axis of the first graph G1 refers to the time elapsed according to the scan of the sample wafer W, and the vertical axis of the first graph G1 represents the relative intensity of the reflection probe pulse affected by the reflectance change of the surface of the sample W of the probe pulse.

The time interval of the distance between the peaks indicated by the double-headed arrows in the first graph G1 may refer to the time during which sound waves travel back and forth with respect to a thickness reaching an interface inside the surface of the sample W for calculating the thickness of the sample W.

In the first graph G1, the measured time intervals of point A P_A and point B P_B and point E P_E and point F P_F are generally the same. For example, the thicknesses from the surface of the sample W to the interface at point A P_A, point B P_B, point E P_E, and point F P_F are substantially the same. In addition, the thickness from the surface of the sample W to the interface at point A P_A, point B P_B, point E P_E, and point F P_F may be obtained through the time interval of the distance between the peak and the peak at each index.

In the first graph G1, compared to the measured time intervals of point A P_A, point B P_B, points E P_E and point F P_F, point C P_C and point D (P_D), the measured time intervals of point C P_C and point D P_D are greater. In addition, the measured time intervals of point C P_C and point D P_D appear to be substantially the same. For example, the thickness from the surface of the sample W to the interface at the point C P_C and the point D P_D are substantially the same. However, the time interval between point C P_C and point D P_D is greater than at point A P_A, point B P_B, point E P_E, and point F P_F. Therefore, similar to the sample W in FIG. 3, it is possible to obtain the thickness from the surface of the sample W to the interface at points C P_C and D P_D to be greater than that at point A P_A, point B P_B, point E P_E, and point F P_F.

In FIG. 1, prior to reaching the sample W or the condensing lens 140, the probe pulse may be split by the first optical splitter 122. The reflection probe pulse, which is a probe pulse that reaches the sample W and is reflected from the surface of the sample W, may be split by the second optical splitter 123 prior to reaching the detector 150.

A split probe pulse that is a probe pulse split by the first optical splitter 122 and a split reflection probe pulse that is a reflection probe pulse that is split by the second optical splitter 123 may both be incident on the surface shape sensing device 200. In the present disclosure, the split probe pulse may be referred to as a first pulse PS_1 and the split reflection probe pulse may be referred to as a second pulse PS_2.

The surface shape sensing device 200 is a device that obtains the surface shape of the sample W based on the phase difference of each pulse through the difference in the time of flight between the probe pulse that is not reflected on the surface of the sample W and the reflection probe pulse reflected on the surface of the sample W. The surface shape sensing device 200 may include a first phase detector 210A, a second phase detector 210B, an RF signal source 220, and a second processor 260.

The first pulse PS_1 may reach the first phase detector 210A. The RF signal source 220 may output a microwave signal to the first phase detector 210A and the second phase detector 210B. The first phase detector 210A synchronizes the first pulse with the microwave signal output from the RF signal source 220 so that the RF signal source 220 may use the first pulse for which the time of flight change is not reflected as a standard for time of flight measurement.

The first phase detector 210A outputs a phase error between the first pulse PS_1 and the microwave signal output from the RF signal source 220 as an electrical signal. When the electrical signal according to the phase error output from the first phase detector 210A reaches the RF signal source 220, the RF signal source 220 provides as feedback the electrical signal according to the phase error. Through a feedback process, the RF signal source 220 synchronizes the first pulse PS_1 reaching the first phase detector 210A with the microwave signal.

The first phase detector 210A may include a phase modulator and a fiber loop based optical-microwave phase detector (FLOM-PD) that outputs the phase error between a light pulse and a microwave signal as an electrical signal by using the interference phenomenon of an optical fiber loop including quarter-wave bias. However, any other method capable of measuring the phase error between the light pulse and the microwave signal may be used. A detailed structure of the FLOM-PD is described below with reference to FIG. 4.

The microwave signal output from the RF signal source 220 may be provided to the first phase detector 210A for synchronization with the first pulse and may be provided to the second phase detector 210B to be used as a reference signal for obtaining the time of flight of the pulse.

The surface shape sensing device 200 may further include a collimator. As an embodiment, when the first pulse PS_1 reaches the collimator, the collimator may inject the first pulse PS_1 into the optical fiber so that the first pulse PS_1 reaches the first phase detector 210A. When the second pulse PS_2 reaches the collimator, the collimator may cause the second pulse PS21 to be incident on the optical fiber so that the second pulse PS_2 reaches the second phase detector 210B.

The second phase detector 210B may output a phase error between the microwave signal synchronized with the first pulse PS_1 and the second pulse PS_2 as an electrical signal. The second pulse PS_2 is a signal affected by the phase delay due to the time of flight according to the step height of the measuring point on the surface of the sample W. The micro signal synchronized with the first pulse PS_1 output from the RF signal source is a signal that is not affected by the step height on the surface of the sample W. When the phase error between the microwave signal synchronized with the first pulse PS_1 and the second pulse PS_2 is obtained, the time of flight of the laser pulse associated with the step height of the measurement target point may be obtained. The second phase detector 210B may output an electrical signal Ve proportional to the phase error using electro-optic sampling.

The second phase detector 210B may include an optical-microwave phase detector based on an optical fiber loop, similar to the first phase detector 210A. Similar to the first phase detector 210A, the second phase detector 210B may include an FLOM-PD. However, embodiments are not limited thereto, and the second phase detector 210B is not limited to including an FLOM-PD, and may implement any other method to measure the phase error between the light pulse and the microwave signal alternatively or additionally.

The first pulse PS_1 may be synchronized with the microwave signal so that the microwave signal may be used as a standard for time of flight measurement. For example, the peak point of the pulse of the first pulse PS_1 generated from the pulse laser and the zero crossing point of the microwave signal generated from the RF signal source may be synchronized to coincide with each other. For synchronization, the first phase detector 210A may output a phase error between the first pulse PS_1 and the microwave signal as an electrical signal, and the output phase error may provide back as feedback to the RF signal source 220.

The second pulse PS_2 is a signal affected by the phase delay due to the time of flight according to the step height of the measurement target point of the sample. Therefore, it is possible to check the time of flight associated with the step height of the measurement target point by detecting the phase error of the second pulse PS_2 with respect to the microwave signal. For example, the phase error may be detected from a phase difference between a peak point of the pulse of the second pulse PS_2 and a zero crossing point of the microwave signal.

In FIG. 3, the second graph G2 is a result graph showing the shape of the surface or the step difference of the surface through the first pulse PS_1 and the second pulse PS_2 in the surface shape sensing device 200. The second graph G2 may be derived through the time of flight of the second pulse PS_2.

In the upper drawing of FIG. 3, the surface shape or surface level difference on the surface of the sample W is indicated by the height of the vertical axis in the second graph G2. In the sample W of FIG. 3, the vertical levels of point A P_A, point B P_B, point E P_E, and point F P_F are substantially the same. In the sample W of FIG. 3, the vertical levels of point C P_C and point D P_D are substantially the same. However, the vertical levels of point C P_C and point D P_D are higher than vertical levels of point A P_A, point B P_B, point E P_E, and point F P_F.

The surface of the sample W is measured in order from points A to F through the complex sensing device 1 according to an embodiment, so that the time of flight of the second pulse PS_2 may be obtained and the second graph G2 may be derived. The height of the vertical axis of the second graph G2 represents the shape of the surface of the sample W or the difference in surface level. In the graph, the vertical axis values of point A P_A, point B P_B, point E P_E, and point F P_F may represent values smaller than vertical axis values of point C P_C and point D P_D.

In the thickness sensing device 100, thickness may be measured by a change in intensity of a probe pulse according to a surface change rate caused by a pump pulse. The split probe pulse split from the probe pulse through the first optical splitter 122, for example, the first pulse PS_1, does not reflect the time of flight according to the step difference. A split reflection probe pulse in which the reflection probe pulse reflected from the probe pulse on the sample W is split in the second optical splitter 123, that is, the second pulse PS_2, reflects the time of flight according to the step and shape of the surface of the sample W. Therefore, the step of the surface or the shape of the surface may be detected by obtaining the time of flight of the first pulse PS_1 and the second pulse PS_2.

However, the second pulse PS_2 arrives at the second phase detector 210B with the reflectance change of the sample W applied. The surface shape sensing device 200 obtains a result value through a change in the amount of light itself of a pulse. The second graph G_2, which is the result graph of the surface shape or surface step by the second pulse PS_2 reflecting the change in reflectance, may include the change in reflectance so that data may be obtained.

To remove the data distortion due to the reflectance change, light quantity correction through continuous light quantity measurement of the sample W is required. The amount of light is substantially measured through the reflection probe pulse generated by the thickness sensing device 100. Accordingly, distortion due to a change in reflectance shown in the surface shape or the second graph G_2, which is the result graph of the surface step, may be corrected through the reflection probe pulse, that is, the second pulse PS_2.

As in FIG. 3, the results of the first graph G_1 may be partially reflected in the second graph G_2. Since the second graph G_2 is result data from the surface shape sensing device 200 and the first graph G_1 is result data obtained from the reflection probe pulse through the detector 150, when the data of the second graph G_2 is corrected with the data of the first graph G_1, the same result as that of the third graph G_3 may be obtained.

The third graph G_3 is a time of flight result graph of a light quantity corrected pulse. In the sample W of FIG. 3, the vertical levels of point A P_A, point B P_B, point E P_E, and point F P_F are substantially the same and the vertical levels of point C P_C and point D P_D are the same. However, the vertical levels of point C P_C, and point D P_D are higher than the vertical levels of point A P_A, point B P_B, point E P_E, and point F P_F. Therefore, as shown in the third graph G_3, compared to the result graphs of other points, the result values of the graphs as a result of measuring point C P_C and point D P_D may appear greater.

In the process of correcting the surface shape from the second pulse PS_2, the reference position of the second pulse PS_2 may be changed. The second pulse PS_2 is a reflection probe pulse affected by an acoustic signal generated from the pump pulse and the reflection probe pulse may be divided into a portion directly affected by an acoustic signal generated from the pump pulse and a portion not directly affected. Accordingly, the reference value of the light amount correction may be corrected based on the second pulse PS_2 immediately before being affected by the acoustic signal. According to another embodiment, the reference value of the light amount correction may be corrected based on the second pulse PS_2 at the moment affected by the acoustic signal. The value of the second pulse PS_2 after being affected by the acoustic signal continuously reflects the changing reflectance of the sample W. Therefore, compared to correcting the amount of light through the second pulse PS_2 after being affected by the acoustic signal, when the amount of light is corrected through the second pulse PS_2 before or at the moment of being affected by the acoustic signal, the surface shape sensing result after correction may be derived more accurately.

By combining the result of the third graph G_3 and the thickness measurement result at each point shown in the first graph G1, the thickness and the surface shape or surface step difference result at each point may be simultaneously obtained. Therefore, since the surface shape and the thickness from the surface to the interface may be obtained for the same point, it is possible to obtain information about the surface of the sample W.

Figure 4:
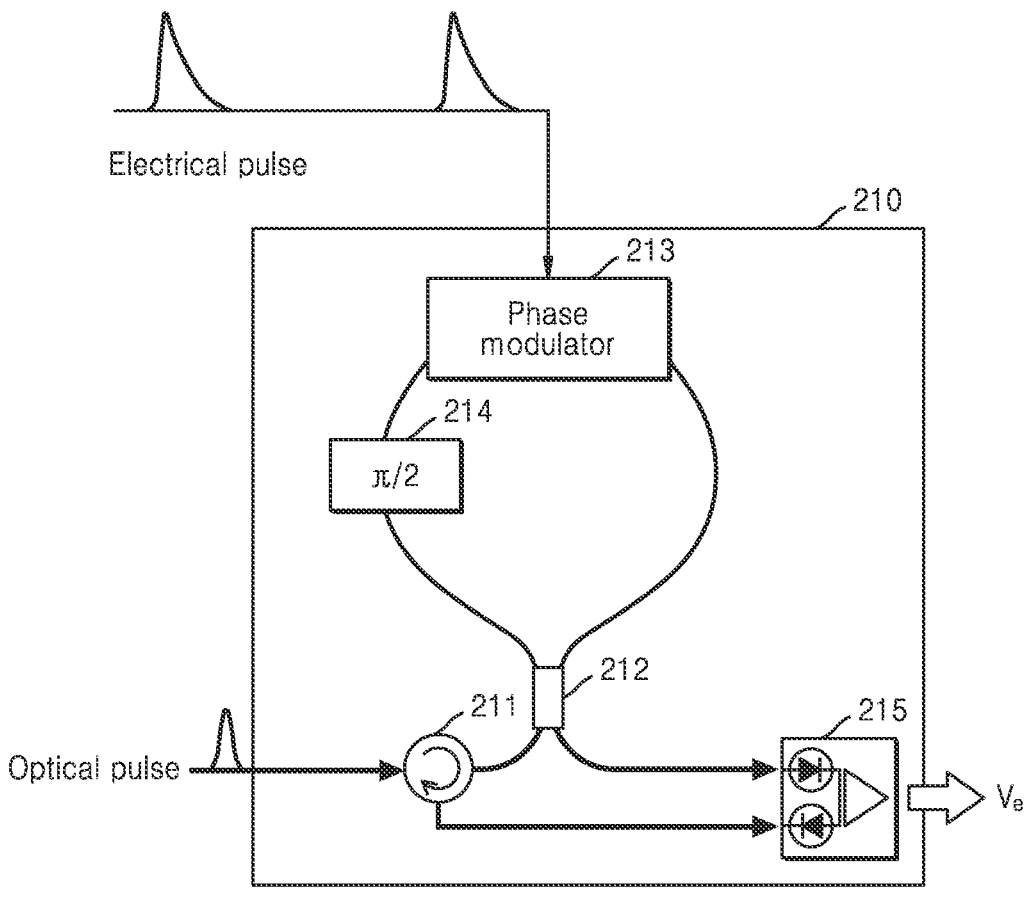
FIG. 4 is a diagram schematically showing the structure of a phase detector constituting a complex sensing device according to an embodiment.

FIG. 4 is a diagram schematically showing the structure of a phase detector constituting a complex sensing device 1 according to an embodiment.

Referring to FIG. 4, the phase detector 210 may be implemented as an FLOM-PD. The phase detector 210 implemented as an FLOM-PD includes a circulator 211, a coupler 212 implemented in a loop, a phase modulator 213, and a quadrature bias 214. The phase detector 210 includes a balanced optical detector 215 that outputs the difference in optical signal intensity as an electrical signal.

The second pulse PS_2 passes through the circulator 211 and reaches the coupler 212. The coupler 212 generates two light pulses by dividing the power of the light pulse in half and transmits the light pulses in different directions of the loop.

The phase modulator 213 receives the microwave signal output from the RF signal source 220 as a reference signal and modulates the phase of the first direction pulse using the reference signal. The phase difference between the first direction pulse and the second direction pulse becomes $\pi/2$ while passing through the quadrature bias 214. In addition, the phase modulator 213 may receive a sinusoidal wave type microwave output from the sinusoidal wave generator 230 of FIG. 5 as a reference signal and perform phase modulation using the received microwave.

The first direction pulse and the second direction pulse, which have a phase difference while circulating around the loop in different directions, are combined in the coupler 212, and interference occurs at this time. The coupler 212 separates the combined optical signals, and the two separated optical signals are input to the balanced optical detector 215. Due to the interference phenomenon, the phase error between the light pulse and the reference signal is converted into a difference in intensity between the two light signals.

The balanced optical detector 215 outputs the difference in intensity of an optical signal received through two photodiodes and a differential amplifier as an electrical signal Ve. The electric signal Ve is proportional to the phase error between the electric pulse and the light pulse and is converted into a measured physical quantity. The electrical signal Ve may be input to the second processing unit 260. Processing and calculation of data related to thickness sensing may be performed in the first processor 160. The second processor 260 may process and obtain data related to the surface shape. In addition, processing and calculation for correcting surface shape data may be performed using reflectance data measured in thickness sensing in the second processor 260. The correction may be performed in the first processor 160.

Figure 5:
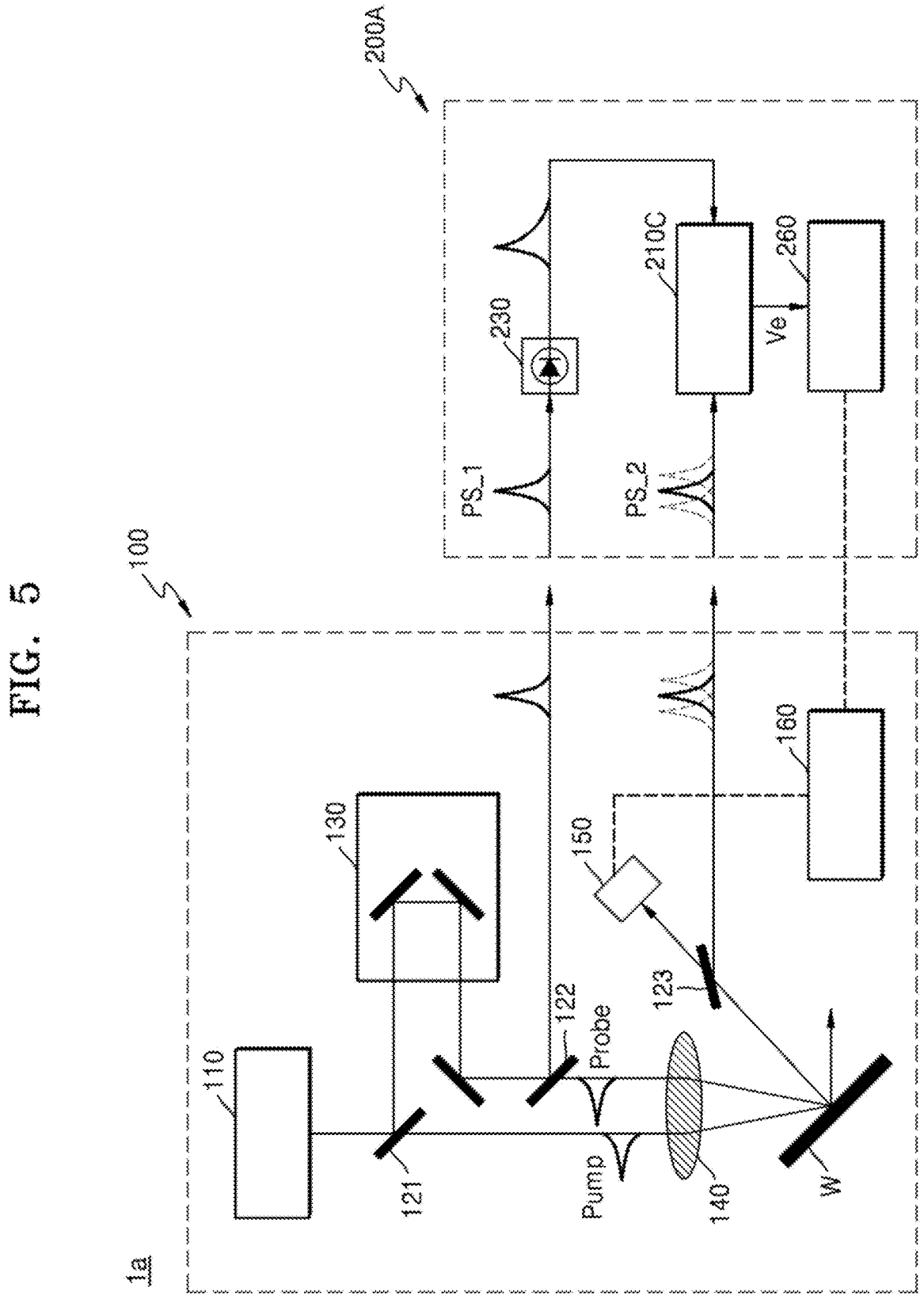
FIG. 5 is a diagram schematically illustrating a complex sensing device 1a according to an embodiment.

FIG. 5 is a diagram schematically illustrating a complex sensing device 1a according to an embodiment. Description that is substantially the same as that given above may be omitted.

Referring to FIG. 5, the surface shape sensing device 200A may include an electric pulse generator 230 and a third phase detector 210C. The first pulse PS_1 may be transferred to an optical path connected to the electric pulse generator 230. The second pulse PS_2 may be transferred to an optical path connected to the third phase detector 150. The third phase detector 210C may receive the second pulse PS_2 and the electric pulse output from the electric pulse generator 230. The third phase detector 210C may output an electric signal Ve proportional to a phase error between the electric pulse and the second pulse PS_2 by using electro-optic sampling.

The phase detectors 210 corresponding to the first phase detector 210A, the second phase detector 210B, and the third phase detector 210C may detect a phase error of the light pulse using a rising edge or a falling edge, which is a certain position of the electric pulse. For example, the phase detector 210 may detect a phase error with respect to a certain point of a rising edge. At this time, any point of the rising edge may be used as a certain point. In particular, since the linearly usable phase (timing) region is widest in both directions at the midpoint of the rising edge, the middle point of the rising edge may be used as a certain point that is the criterion for error detection.

The phase detector 210 may be implemented with various technologies that output an electric signal Ve proportional to a phase error between an electric pulse and a light pulse. For example, the phase detector 210 uses various methods, such as an FLOM-PD using a Sagnac loop interferometer, a 3×3 coupler-based phase detector, and a balanced optical-microwave phase detector (BOM-PD). A bandpass filter (BPF) may be further provided after the electric pulse generator 230. When the BPF is provided, a selected frequency among electric pulse frequencies may be output as a sinusoidal microwave. Even if a BPF is provided in this way, an electrical signal Ve proportional to a phase error between the electrical pulse and the second pulse PS_2 may be output using electro-optic sampling through the third phase detector 210C. The processing of the result has been described above with reference to FIGS. 1 to 3.

At least one of the components represented by a block in the drawings, for example, the first processor 160, the second processor 260 and various generators and detectors, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described above).

While embodiments have been described with reference to the figures, it will be understood by those of ordinary skill in the art that various changes in form and details may be made therein without departing from the spirit and scope as defined by the following claims and their equivalents.

What is claimed is:

1. A complex sensing device comprising:
   a thickness sensing device comprising:
   a pulse generator configured to generate a probe pulse and a pump pulse;
   a first optical splitter configured to:
      split the probe pulse into a first probe pulse and a second probe pulse, and direct the first probe pulse to a surface of a sample and the second probe pulse to a surface shape sensing device; and
      direct the pump pulse to the surface of the sample and generate an acoustic signal in the sample;
   a detector configured to receive a reflection probe pulse generated by the first probe pulse being reflected from the sample;
   a first processor configured to receive and process a first signal from the detector; and
   a second optical splitter on a path of the reflection probe pulse reflected from the sample to the detector, the second optical splitter being configured to split the reflection probe pulse; and
   the surface shape sensing device configured to receive the second probe pulse split from the first optical splitter and a split reflection probe pulse split from the second optical splitter, and measure a surface shape of the sample based on a phase difference between the second probe pulse and the split reflection probe pulse.

2. The complex sensing device of claim 1, wherein the pulse generator comprises:
   a light source configured to generate pulses;
   a pulse splitter configured to split the pulses into the probe pulse and the pump pulse; and
   a delay stage configured to delay the probe pulse.

3. The complex sensing device of claim 1, wherein the surface shape sensing device comprises:
   a radio frequency (RF) signal source configured to generate a microwave signal;
   a first phase detector configured to synchronize the microwave signal with the second probe pulse;
   a second phase detector configured to receive the split reflection probe pulse and the microwave signal, and output a second signal corresponding to a phase error between the microwave signal with the second probe pulse; and
   a second processor configured to receive and process the second signal.

4. The complex sensing device of claim 1, wherein the surface shape sensing device comprises:
   an electric pulse generator configured to photoelectrically convert the second probe pulse into an electric pulse;
   a phase detector configured to output a second signal corresponding to a phase error of the split reflection probe pulse and the electric pulse; and
   a second processor configured to receive and process the second signal.

5. The complex sensing device of claim 3, wherein the second processor is further configured to receive the first signal and the second signal, and correct an amount of light based on the second signal to measure the surface shape of the sample.

6. The complex sensing device of claim 5, wherein the second processor is further configured to correct the amount of light based on the first signal generated through the reflection probe pulse prior to being affected by the acoustic signal.

7. The complex sensing device of claim 5, wherein the second processor is further configured to correct the amount of light based on the first signal generated through the reflection probe pulse when being affected by the acoustic signal.

8. The complex sensing device of claim 3, wherein the second processor is further configured to obtain a shape of an interface inside the surface of the sample by combining a value obtained from the thickness sensing device and a value obtained from the surface shape sensing device.

9. The complex sensing device of claim 8, wherein the shape of the interface is obtained based on the surface shape obtained from the surface shape sensing device, excluding a thickness obtained from the thickness sensing device.

10. The complex sensing device of claim 1, further comprising a carrier configured to move the sample in a plane to continuously sense the sample.

11. The complex sensing device of claim 3, wherein the first phase detector is further configured to output the phase error between the microwave signal and the second probe pulse and provide the phase error to the RF signal source to synchronize the microwave signal with the second probe pulse.

12. The complex sensing device of claim 1, wherein the pulse generator has a wavelength greater than or equal to 750 nm and less than or equal to 850 nm, and a pulse repetition rate less than or equal to 100 MHz.

13. A complex sensing device comprising:
a thickness sensing device comprising:
a pulse generator configured to generate a probe pulse and a pump pulse;
a first optical splitter configured to:
split the probe pulse into a first probe pulse and a second probe pulse, and direct the first probe pulse to a surface of a sample and the second probe pulse to a surface shape sensing device; and
direct the pump pulse to the surface of the sample and generate an acoustic signal in the sample;
a detector configured to receive a reflection probe pulse generated by the first probe pulse being reflected from the sample;
a second optical splitter on a path of the reflection probe pulse reflected from the sample to the detector, the second optical splitter being configured to split the reflection probe pulse;
a first processor configured to receive and process a first signal from the detector; and
a phase detector configured to receive a split reflection probe pulse split from the reflection probe pulse; and
the surface shape sensing device configured to obtain a surface shape of the sample based on the second probe pulse split from the probe pulse and a signal output from the phase detector for measurement.

14. The complex sensing device of claim 13, wherein the surface shape sensing device comprises:
a radio frequency (RF) signal source configured to output a microwave signal; and
a synchronization phase detector configured to input the microwave signal and the second probe pulse, and synchronize the microwave signal output from the RF signal source with the second probe pulse,
wherein the phase detector is further configured to output a phase error of the synchronized microwave signal and the split reflection probe pulse respectively input to the phase detector and output a second signal corresponding to the phase error.

15. The complex sensing device of claim 13, wherein the surface shape sensing device comprises an electric pulse generator that is configured to photoelectrically convert the second probe pulse and output an electric pulse input to the phase detector,
wherein the phase detector is further configured to output a second signal corresponding to a phase error of the electrical pulse and the split reflection probe pulse input to the phase detector.

16. The complex sensing device of claim 14, further comprising a processor configured to receive the first signal and the second signal, and correct an amount of light based on the second signal to measure the surface shape of the sample.

17. The complex sensing device of claim 16, wherein the processor is further configured to correct the amount of light based on the first signal generated based on the reflection probe pulse when the pump pulse reaches the sample or prior to the pump pulse reaches the sample.

18. A complex sensing method comprising:
emitting a probe pulse and a pump pulse from a pulse generator;
splitting the probe pulse into a first probe pulse and a second probe pulse, and directing the first probe pulse toward a sample and the second probe pulse to a surface shape sensing device by a first optical splitter;
irradiating the sample with the pump pulse and the first probe pulse;
transmitting a reflection probe pulse, which is the first probe pulse reflected by the sample, to a detector;
splitting the reflection probe pulse toward the detector by a second optical splitter;
inputting the second probe pulse split from the probe pulse by the second optical splitter and a split reflection probe pulse split from the reflection probe pulse by the second optical splitter to the surface shape sensing device;
sensing a thickness of the sample based on a change in reflectance of the sample obtained by the detector; and
sensing a surface shape of the sample through time of flight difference data between the second probe pulse and the split reflection probe pulse in the surface shape sensing device.

19. The method of claim 18, wherein the sensing of the surface shape comprises sensing the surface shape of the sample by correcting the time of flight difference data through reflectance change data of the sample.

* * * * *